United States Patent [19]

McCreedy et al.

[11] Patent Number: 4,576,721
[45] Date of Patent: Mar. 18, 1986

[54] MISCIBLE POLYMER BLENDS CONTAINING POLY(2-ALKYL-2-OXAZOLINE)

[75] Inventors: Kathleen M. McCreedy, Midland, Mich.; Henno Keskkula, Austin, Tex.; James C. Pawloski; Edward H. Yonkers, both of Midland, Mich.

[73] Assignee: The Dow Chemical Company, Midland, Mich.

[21] Appl. No.: 736,510

[22] Filed: May 21, 1985

Related U.S. Application Data

[62] Division of Ser. No. 552,211, Nov. 15, 1983.

[51] Int. Cl.$^4$ ............................................. B01D 13/00
[52] U.S. Cl. .................. 210/640; 210/500.2; 521/61; 521/64; 521/134; 521/135; 521/139; 521/140; 525/107; 525/108; 525/113; 525/119; 525/410; 525/526; 525/528

[58] Field of Search ............... 210/500.2, 640; 521/61, 521/64, 134, 135, 139, 140; 525/107, 108, 113, 119, 410, 526, 528

[56] References Cited

U.S. PATENT DOCUMENTS

| | | | |
|---|---|---|---|
| 3,750,735 | 8/1973 | Chiang et al. | 210/640 |
| 3,773,848 | 11/1973 | Perry et al. | 210/640 |
| 3,950,247 | 4/1976 | Chiang et al. | 210/640 |
| 4,035,291 | 7/1977 | Chiang et al. | 210/640 |
| 4,405,460 | 9/1983 | Dissebeck et al. | 210/640 |
| 4,460,473 | 7/1984 | Curtin | 210/640 |

*Primary Examiner*—Morton Foelak

[57] ABSTRACT

Miscible blends of poly-2-oxazolines and thermoplastic polymers are disclosed herein. These blends exhibit a single glass transition point indicative of a miscible blend. The blends of this invention are useful as membranes, particularly separation membranes for mixtures of organic compounds or organic compounds and water and a perevaporation process.

3 Claims, No Drawings

MISCIBLE POLYMER BLENDS CONTAINING POLY(2-ALKYL-2-OXAZOLINE)

CROSS-REFERENCE TO RELATED APPLICATION

This is a divisional, of application Ser. No. 552,211, filed Nov. 15, 1983.

BACKGROUND OF THE INVENTION

This invention relates to blends and alloys of polymers of 2-oxazolines, and to articles, particularly membranes, prepared therefrom.

Polymers of 2-oxazolines are generally hydrophilic water-soluble materials. Such oxazoline polymers have proven utilities as adhesion promoters and viscosity modifiers in similar applications. Unfortunately, however, such oxazoline polymers when formed into solid articles such as films exhibit very poor mechanical properties and show sensitivity to atmospheric moisture. Dried films of oxazoline polymers are too brittle to be useful in most applications. Water causes dissolution of such articles and films.

Despite these mechanical problems which limit the utility of oxazoline polymers, said polymers have many desirable properties such as hydrophilicity which would be advantageous in many solid articles such as films. It would therefore be desirable to prepare solid articles containing oxazoline polymers which exhibit good mechanical and physical properties.

Oxazoline polymers have previously been employed in small amounts as additives in water-insoluble polymer compositions. In addition, polymers of oxazoline have been blended with polyolefins to form immiscible blends. However, it is not heretofore been attempted to prepare blends or alloys of oxazoline polymers and other polymers comiscible therewith.

SUMMARY OF THE INVENTION

In one aspect, the present invention is a blend or alloy of a first polymer which is a polymer of a 2-oxazoline and at least one other polymer which is not a polymer of a 2-oxazoline, wherein said other polymer is miscible with said first polymer in the relative proportions thereof present in said blend or alloy, and wherein the weight ratio said first polymer to said other polymer present in said blend or alloy is from about 19:1 to 1:19, preferably from about 9:1 to 1:9.

In another aspect, this invention is a semipermeable membrane comprising a blend or alloy of a first polymer which is a polymer of a 2-oxazoline, at least one other polymer which is not a polymer of a 2-oxazoline and which other polymer is miscible with said first polymer in relative proportions thereof present in said blend or alloy and wherein the weight ratio of said first polymer to said other polymer present in said blend or alloy is from about 19:1 to about 1:19, preferably from about 9:1 to about 1:9.

Surprisingly, it has been found that miscible blends of 2-oxazoline polymers are prepared with a variety of other polymers. The miscibility of 2-oxazoline polymers with such polymers is unexpected in light of the diverse structures and properties of the component polymers, especially the differences in solubility characteristics.

Also surprising is that even though these blends contain substantial amounts of 2-oxazoline polymers, the 2-oxazoline polymer is not extractable from the blend in significant quantities when the blend is contacted with water. Accordingly, these blends can be used in applications which require contacting the blend with an aqueous environment.

In addition, in many cases the blends of this invention exhibit improved physical properties as compared to the 2-oxazoline polymer alone.

The blends of this invention exhibit utility as membranes, particularly as pervaporation membranes for use in separating components of liquid mixtures such as water/ethanol or ethanol/hexane mixtures. Membranes comprising the blends of this invention exhibit particularly high selectivities and/or fluxes as compared to corresponding conventional permeation membranes.

DETAILED DESCRIPTION OF THE INVENTION

The 2-oxazoline polymers employed herein are polymers containing pendant N-acyl groups, as represented by the structure (I).

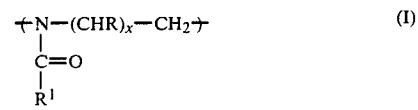

Such 2-oxazoline polymers are readily prepared by the ring opening polymerization of 2-oxazolines or like compounds, represented by the structure (II)

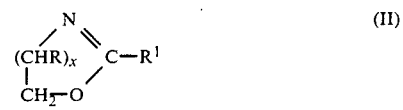

wherein R is hydrogen or an inertly substituted lower alkyl group; $R^1$ is typically hydrogen, inertly substituted phenyl or an inertly substituted lower alkyl; and x is 1 or 2. The substituents and subscripts are hereinafter defined. The ring-opening polymerization of 2-oxazoline monomers is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazonium-fluoroborates, dialkyl sulfates and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. 1,206,585; Jones and Roth, U.S. Pat. No. 3,640,909; and Litt et al., U.S. Patent No. 3,483,141.

The polymer obtained in the polymerization of 2-oxazoline is linear, N-acylated polyalkyleneimine having a molecular structure consisting of repeating units (I). If desired, a portion of said N-acyl groups may be hydrolyzed. Generally, hydrolysis of such N-acyl groups tends to decrease the miscibility of the 2-oxazoline polymer with the other polymer employed herein. Accordingly, it is typically not desirable to employ a 2-oxazoline polymer having greater than 25 number percent of such N-acyl groups hydrolyzed. Preferably, fewer than 10 number percent of such N-acyl groups are hydrolyzed.

The term 2-oxazoline is used herein to describe compounds having the general structure as defined by II, including species wherein x is 2. The term "inertly substituted" means that the moiety referred to contains no substituent group which interferes with the polymerization of the 2-oxazoline, or to the ability of the polymer to form a miscible blend with said other polymer.

Illustrative inert substituents include alkenyl, hydrocarbyl, alkoxy and the like. Exemplary R substituents include hydrogen, methyl, ethyl N-propyl and exemplary $R^1$ substituents include hydrogen, methyl, ethyl, propyl, pentyl, cyclohexyl, and the like.

Preferably, x is 1, each R is hydrogen and $R^1$ is a lower alkyl group, especially an ethyl group. The 2-oxazoline is most preferably 2-ethyl-2-oxazoline. The most preferred 2-oxazoline polymer is poly(2-ethyl-2-oxazoline) which is non-hydrolyzed.

Typically, the 2-oxazoline polymer has a molecular weight within the range of 1,000 to 1,000,000. In the present invention, it is preferable to use a 2-oxazoline polymer having a molecular weight within the range of about 100,000 to about 600,000.

The 2-oxazoline polymer is incorporated into the other polymer by any known blending technique such as conventional melt blending equipment, including compounding extruders, Banbury mixers, roll mills and the like, as well as by solution blending in a suitable solvent.

The oxazoline polymer is blended with at least one other polymer which is not a polymer of a 2-oxazoline. Said other polymer is water-insoluble and capable of forming a miscible blend with the oxazoline polymer.

A "miscible blend" as that term is used herein refers to a blend of an oxazoline polymer and at least one other polymer which blend exhibits only one glass transition temperature ($T_g$). By contrast, blends of polymers which are immiscible exhibit the characteristic $T_g$'s of each component of the blend. If such polymers form a miscible blend, the $T_g$ of the individual components are not exhibited by the blend. Instead, the blend exhibits a characteristic $T_g$ of its own.

Procedures for determining the $T_g$ of polymers or blends of polymers are well known in the art. Differential Scanning Calorimetry (DSC) is an especially suitable technique for measuring $T_g$.

The other polymer employed herein does not necessarily form miscible blends with the oxazoline polymer in all proportions. It is recognized that certain polymers form miscible blends with oxazoline polymers only when blended therewith within a limited range of proportions. Blends of 2-oxazoline polymers with such other polymers are considered to be within the scope of this invention when such blends are miscible blends as defined herein.

Exemplary polymers which form comiscible blends with polymers of 2-oxazoline in a wide range of proportions include certain styrene/acrylonitrile copolymers; rubber modified styrene/acrylonitrile polymers; phenoxy resins; certain styrene/acrylic acid copolymers and the like. Polymers which form miscible blends with polymers of 2-oxazoline in a narrower range of proportions include, for example, polyvinylidiene chloride; copolymers of vinylidiene chloride and vinyl chloride; and styrene/acrylic acid copolymers containing small amounts of acrylic acid.

Styrene/acrylonitrile copolymers (SAN polymers) which are prepared from a monomer mixture containing from about 18 to about 50 percent by weight acrylonitrile form miscible blends with polymers of 2-oxazolines in all proportions. Any of such SAN copolymers having such acrylonitrile content may be employed herein. Exemplary SAN polymers are commercially available from The Dow Chemical Company under the TYRIL ® brand name.

In addition, rubber-modified SAN polymers are useful herein. Such rubber modified SAN polymers typically comprise a continuous matrix of SAN polymer having colloidially sized rubber particles dispersed therein. Said rubber particles generally have a volume average particle diameter of less than 1 micron, perferably less than about 0.5 micron, more preferably between 0.05 and 0.5 microns. Said rubber particles comprise a natural or synthetic elastomeric polymer which is preferably a polymer of a conjugated diene monomer such as isoprene or butadiene. More preferably, the rubber particle is a polybutadiene. In said more preferred embodiment, the rubber modified SAN polymer is a so-called ABS (acrylonitrile/butadiene/styrene) terpolymer. Generally, the continuous SAN matrix can be prepared from a monomer mix containing from about 15 to about 50 percent by weight acrylonitrile based on the weight of monomers. The rubber content of the rubber modified SAN polymer can range from about 0.1 to about 50, preferably from about 5 to about 20 percent by weight of the rubber modified polymer.

Suitable styrene/acrylic acid copolymers include those which are polymers of a monomer mixture containing from about 15 to about 50 percent acrylic acid based on weight of monomers. Such polymers form miscible blends with the oxazoline polymer in all proportions.

Diverse epoxy or phenoxy resins form miscible blends with the oxazoline polymer in a wide range of proportions. Most generally, epoxy resins are oxirane-containing monomers or prepolymers comprising the reaction product of epichlorohydrin and an active hydrogen containing compound. Such epoxy resins prepared from bisphenol A typically have have molecular structures as represented by the structures

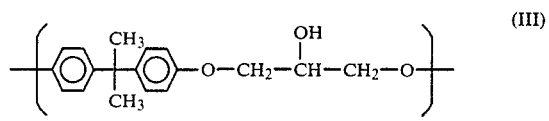

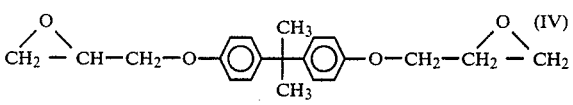

Those epoxy resins having structures corresponding to structure III, or similar structures, are generally high molecular weight thermoplastic resin. Blends prepared from such thermoplastic resins are also thermoplastic. Epoxy resins having terminal oxirane groups, such as depicted in structure IV, are curable with heating and the addition of a curing agent such as a polyamine, oxyalkylated short chain polyamine, polyamidoamine and the like. Blends of this invention containing such curable epoxy resin are usually cross-linkable (thermosettable) by incorporating such a curing agent into the blend. In addition, the so-called phenol novalac and epoxy cresol novalac resins are useful herein. Preferably, however, the epoxy is a high molecular weight polymer thermoplastic polymer as described herein.

Such epoxy and phenoxy resins are widely commercially available. Methods for the preparation, curing and use of such epoxy resins are described in Sherman et al. "Epoxy resins" Kirk-Othmer Encyclopedia of Chemical Technology, 3rd Ed., Vol. 9, pages 267-290 (1980).

Vinylidiene chloride polymers and copolymers thereof, especially copolymers thereof with vinyl chloride, form miscible blends with oxazoline polymers when said blend contains at least about 45 percent by weight of oxazoline polymer based on the combined weight of the vinylidiene chloride and oxazoline polymer.

Similarly, styrene/acrylic acid (SAA) polymers which are polymerized from a monomer mixture containing from about 5 to 15 weight percent acrylic acid form miscible blends with oxazoline polymers when the blend contains about 0 to 60 weight percent of oxazoline polymer. It is noted, however, that as the acrylic acid content of the SAA copolymer decreases, the copolymer forms miscible blends only with decreasing amounts of oxazoline polymer. For example, a SAA polymer containing 8 percent acrylic acid forms miscible blends containing up to 60 percent of the oxazoline polymer. By contrast, a SAA polymer containing 5 percent acrylic acid forms a miscible blend only when the blend contains about 25 percent or less of the oxazoline polymer.

In addition to the polymers specifically described herein, the blends of this invention may comprise any other polymer which is capable of forming a miscible blend with the oxazoline polymer. The ability of any particular polymer to form a miscible blend with the oxazoline polymer is easily tested by blending a small quanity of the polymer being tested with the oxazoline polymer in the desired proportions and determining the $T_g$ of the blend so obtained.

In addition to the oxazoline polymer and at least one other comiscible polymer, the blends of this invention may further contain or be blended with diverse materials such as other polymers, inert fillers, plasticizers, pigments, antioxidants, mold release agents, preservatives, and the like. The benefical use of such materials is well understood by those skilled in the relevant arts.

Crosslinking agents are also beneficially, but optionally, employed in the blends of this invention. Various materials are known to crosslink oxazoline polymers including diisocyanates, as described in U.S. Pat. No. 4,087,413 to Kelyman et al. In addition, crosslinking agents which crosslink the other polymer contained in the blend are usefully employed in this invention.

When an epoxy or other thermosetting resin is employed herein, the blend advantageously contains a curing agent therefor.

The blends of this invention exhibit desirable physical and chemical properties which make said blends useful in a variety of applications, particularly membrane applications. Often, the physical properties of these blends are better than those exhibited by the oxazoline polymer alone. In addition, these blends usually exhibit increased water wettability as compared to the nonoxazoline polymer alone.

A surprising aspect of the blends of this invention is that little or none of the oxazoline polymer contained therein is extractable from the blends with water. This property is unexpected in that oxazoline polymers are known to be readily soluble in water and are extractable from blends with another polymer which is not miscible with the oxazoline polymer. Generally, less than 25, preferably less than 10, weight percent of the oxazoline polymer in the blend is extractable with water. Most preferably, less than about 5 weight percent of the oxazoline polymer is extractable from the blend.

Because the oxazoline polymer is not readily extracted from the blends of this invention, the blends are suitable for use in aqueous environments or in contact with mixtures of water and alcohols or other polar organic molecules which are not solvents for the other polymers in the blend. It is noted, however, that 2-oxazoline polymers are sometimes extractable from miscible blends with alcohol or mixtures of alcohol and a minor amount of water.

The blends of this invention typically exhibit a refractive index intermediate to those of the component polymers. Accordingly, the blends of this invention can often be prepared such that the blend has a certain desired refractive index. This is especially significant in the preparation of certain rubber-modified polymers, where clarity is improved by employing a polymer and rubber which have the same refractive index. Using the blends of this invention, the refractive indices of the polymer matrix and the rubber particles can be matched to yield a rubber-modified polymer with improved clarity. In particular, blends of 2-oxazoline polymers and a SAN polymer may be employed to form such higher clarity rubber-modified polymers.

The blends of this invention are especially useful as semi-permeable membranes. Semi-permeable membranes are those which are readily permeated by certain materials but which are substantially impermeable to other materials. Accordingly, said membranes are useful for separating or concentrating the components of a fluid mixture (i.e., mixtures of liquids or gases).

More particularly, the blends of this invention are useful for separating the components of a fluid mixture of two or more organic compounds in a pervaporation process. In said pervaporation process, one side of the membrane (the feed side) is contacted with a fluid mixture containing two or more components. A pressure gradiant is provided across the membrane so that the permeate side of the membrane is at a lower pressure than the feed side. From the permeate side of the membrane is withdrawn a vaporous permeate which contains a higher concentration of one component than is contained in feed mixture. General procedures for such pervaporation process are described in U.S. Pat. Nos. 3,950,247 and 4,035,291 to Chiang et al. Generally, the permeate side of the membrane is maintained at a pressure lower than the vapor pressure of the major component of the permeate. The permeate side of the membrane may be subjected to pressure as low as 0.1 mm of mercury. In addition, superatmospheric pressure may be applied to the feed side of the membrane. The temperature at which the separations are conducted affects both the selectivity and permeation rate. As the temperature increases, the permeation rate rapidly increases while selectivity decreases slightly. This increase in rate, however, may be compensated for by the increase in energy needed to maintain the system at an elevated temperature. In general, the temperature is sufficiently high that the components of the permeate have a substantial vapor pressure at the temperature at which the separation is effected and sufficiently low that the membrane is stable. Advantageously, the temperature is from about $-10°$ C. to about 95° C.

The membrane of this invention is useful in separating water from organic compounds which are miscible with water. Exemplary water-miscible compounds include, but are not limited to, aliphatic alcohols, such as methanol, ethanol, propanol, hexanol, and the like; ketones, such as ethylmethyl ketone, acetone, diethyl ketone, and the like; aldehydes, such as formaldehyde, acetaldehyde and the like; alkyl esters of organic acids such as ethylacetate, methyl propionate, and the like; p-dioxane; alkyl and cycloalkyl amines and other water-miscible organic compounds which do not chemically react with or dissolve the membrane of this invention. In addition, the organic compound may be one in which water has limited solubility, such as chlorinated alkanes like chloroform and carbon tetrachloride. Preferably, the organic compound is an aliphatic alcohol, a ketone or an aldehyde, with lower alcohols, especially ethanol, being preferred.

In addition, the membrane of this invention is useful in separating mixtures of organic compounds particularly mixtures of a relatively polar organic compound with a less polar organic compound. The organic compounds in said mixture are preferably comiscible compounds but may be only partially miscible. Exemplary organic mixtures which can be separated with the membrane of this invention include, for example, mixtures of aliphatic alcohols with aromatics or alkanes, such as ethanol/benzene, ethanol/hexane, methanol/hexane, propanol/toluene mixtures; methanol/methyl acetate, isopropanol/ethyl acetate, methanol/acetone, ethanol/ethyl acetate and like mixtures. A wide range of mixtures of compounds may be separated using the membrane of this invention provided that such mixture does not substantially dissolve or react with the membrane under the conditions at which the separation is effected.

The following examples are provided to illustrate the invention and are not intended to limit the scope thereof. All parts and percentages are by weight unless otherwise indicated.

EXAMPLE 1

This example illustrates miscible blends of polyethyloxazoline (PEOX) with a rubber-modified styrene/acrylonitrile (ABS) resin. The resin employed is a polybutadiene modified resin containing 13.5 weight percent rubber dispersed in a continuous SAN matrix. The average size of the rubber particles is 0.5 microns. The continuous SAN matrix is prepared from a monomer mixture containing 25 weight percent acrylonitrile.

Blends are prepared by melting the ABS and PEOX polymers together in an oil-heated Brabender mixer at 190° C. for 10 minutes. In this manner, blends containing 0, 20, 40, 60 and 80 percent PEOX are prepared.

The glass transition temperature ($T_g$) of each of the blends is determined using a Perkin-Elmer DSC-2 calorimeter. The heating rate is 20° per minute. The $T_g$ is defined as the intersection of the heat capacity slopes of the glassy and transition regions. In preparing samples for the DSC, a weighed amount of the blend is placed in a tared DSC aluminum dish and then heated on a hot plate at about 200°-230° C. for 30 seconds to melt the blends. The melted sample is then cooled in the DSC dish and evaluated in the calorimeter.

Moldings are prepared from the blends by grinding, followed by compression molding. The ground polymer is preheated for 3 minutes at 190° C. in the compression mold followed by heating for 3 minutes under full pressure. The molding is cooled under pressure.

The molded blends are all clear or only slightly hazy. Each of the blends exhibits only one $T_g$, indicating that such blends of PEOX and ABS resins are miscible in all proportions.

In addition, a blend containing 10 percent PEOX and 90 percent ABS resin is prepared and molded as described above. This molding exhibits a tensile strength at rupture of 5500 psi, 33 percent elongation at rupture, a modulus of $3.2 \times 10^{-5}$ psi and a notched Izod of 3.2 lb/min.

EXAMPLE 2

Blends of a styrene/acrylic acid (SAA) copolymer (20 percent acrylic acid) and PEOX containing 0, 20, 40, 60 and 80 percent PEOX are prepared and molded as described in Example 1. In each case a clear molding is obtained. The $T_g$ of each of the blends is determined by DSC as described in Example 1. In each instance, the blend exhibits only one $T_g$.

Blends of an SAA polymer (containing 8 percent acrylic acid) are prepared containing 0, 20, 40, 60 and 80 percent PEOX. The blends containing 40 percent or less PEOX are clear. Those containing 60 and 80 percent PEOX are hazy. The $T_g$ of each of the blends is determined. Those blends containing 60 percent or less PEOX exhibit a single $T_g$ and are accordingly examples of this invention. Those containing greater than 60 percent PEOX exhibit two $T_g$'s and are, therefore, not miscible blends. Accordingly, these immiscible blends are not examples of this invention.

A SAA polymer containing 5 percent acrylic acid is blended with PEOX at varying proportions as described herein. Miscible blends are formed when the blend contains less than about 30 weight percent PEOX.

EXAMPLE 3

Blends of polyethyloxazoline and vinylidene chloride/vinyl chloride copolymer (13.5 percent vinyl chloride $M_w = 10,100$) containing 0, 20, 40, 60 and 80 percent PEOX are prepared by dissolving the PEOX and vinylidene chloride copolymer in tetrahydrofuran (THF) at 60° C. with stirring. The polymers are precipitated with n-heptane and dried under vacuum at 60° C. for 5 days. The blends containing greater than 50 percent PEOX exhibit a single $T_g$ and are accordingly examples of this invention. The blends containing less than 50 percent PEOX exhibit two $T_g$ and are, therefore, not miscible blends.

EXAMPLE 4

Blends are prepared by dissolving PEOX and a thermoplastic phenoxy resin sold as TKHH resin by Union Carbide Corporation in THF at room temperature. Blends containing 20, 40, 60 and 80 percent PEOX are prepared in this manner. Films are prepared from such blends by casting a film of the dissolved blend and then evaporating the solvent. The blends all exhibit a single $T_g$ indicating that the PEOX and the phenoxy resin are miscible in all proportions.

EXAMPLE 5

In this example, polyethyloxazoline ($M_w$ equal 400,000) is melt blended with diverse SAN resins having various AN contents. The resulting blends are compression molded as described hereinbefore and the $T_g$ of the molded blends is determined by DSC. The polymer employed in the blends and the results obtained are as described in the following table.

TABLE

| Polymer | % AN[1] | % PEOX[2] | Miscibility[3] | T$_g$ (Miscible Blends) °C. |
|---|---|---|---|---|
| SAN-8 | 8 | | Immiscible in all proportions | |
| SAN-16 | 16 | | Immiscible in all proportions | |
| SAN-21 | 21 | 25 | Yes | 95.5 |
| SAN-21 | 21 | 50 | Yes | 76.4 |
| SAN-21 | 21 | 75 | Yes | 70.3 |
| SAN-25 | 25 | 20 | Yes | 85 |
| SAN-25 | 25 | 40 | Yes | 70 |
| SAN-25 | 25 | 60 | Yes | 62 |
| SAN-25 | 25 | 80 | Yes | 58 |
| SAN-40 | 40 | 20 | Yes | 90 |
| SAN-40 | 40 | 40 | Yes | 78 |
| SAN-40 | 40 | 60 | Yes | 69 |
| SAN-40 | 40 | 80 | Yes | 62 |

[1]Weight % Acrylonitrile repeating units in SAN polymer
[2]Weight percent polyethyloxazoline in blend. The polyethyloxazoline has a molecular weight of 400,000, except those blended with SAN 16 and 21 which have a molecular weight of 606,000.
[3]"Yes" indicates that the blend exhibits only one T$_g$.

From the foregoing Table it is seen that SAN polymers form miscible blends with PEOX in all proportions provided the SAN polymer contains at least about 18 percent acrylonitrile repeating units.

The sample of the blend containing 60 percent SAN (24 percent AN) and 40 percent PEOX is extracted with water in an attempt to remove the PEOX content therefrom. A weighed dry sample of the molded blend (1.25 by 1.25 by .01 cm) is extracted with 10 g of water for 3 days at room temperature under mild agitation. The thus treated sample is then dried and weighed to determine the amount of PEOX which is extracted from the water. Under these conditions, no PEOX is extracted from the blend. Substitution of 10 percent of the water with ethanol leads to extraction of 8 weight percent of the PEOX in the blend. Forty-four percent of the PEOX is extracted with a 50/50 ethanol water solution.

A membrane is prepared from the blend containing 60 percent SAN (24 percent AN) and 40 percent PEOX by melt blending and compression molding as described above. The membrane has a thickness of 5 mils.

The membrane is placed onto an in-line filter holder so that a 14.2 cm² section of the membrane is open to feed solution. The membrane is supported with Whatman #50 filter paper. The permeate end of the filter holder is connected to a vacuum pump with two cold traps placed in line to collect the permeate by condensation. The membrane and holder are then immersed in a closed flask containing the mixture to be separated. The flask is equipped with thermometer for measuring temperature and a reflux condenser to prevent feed loss due to evaporation.

Separation is effected by pulling a vacuum of about 0.1 mm Hg on the permeate side of the membrane and collecting the permeate in the cold trap. The temperature of the feed solution is maintained at 35° C. The permeation rate is calculated by periodically weighing the collected permeate. The permeate composition is determined by gas chromatography using a Hewlett-Packard 5840A gas chromatograph equipped with a thermal conductivity detector.

The membrane is used to separate various ethanol/hexane mixtures. Each separation is effected until a steady state condition is obtained (typically about 25 hours). Once a steady state is reached, the content of the permeate and permeation rate are determined. The feed solution is a mixture of 7.3 percent ethanol and 92.7 percent hexane. The permeate contains 97.7 percent ethanol. The separation factor $\alpha_e$ defined as:

$$\alpha_e = \frac{\% \text{ ETOH}/\% \text{ Hexane in permeate}}{\% \text{ ETOH}/\% \text{ Hexane in feed}}$$

is determined to be 539. The permeation rate of this membrane is 174 g-mil-/m²-hr.

The foregoing separation is repeated, this time employing a membrane which is a blend of 60 weight percent SAN resin (40 percent AN) and 40 percent PEOX. In this case, the feed contains 7.5 percent ethanol and 92.5 percent hexane and the permeate contains 99.5 percent ethanol, yielding an $\alpha_e$ of 2,454. The permeation rate is 31 g-mil/m²-hr.

For comparison, the foregoing separation is repeated this time employing a membrane comprising 100 percent SAN resin (40 percent AN). The feed contains 7.4 percent ethanol and 92.6 percent hexane and the permeate contains 2 percent ethanol yielding an $\alpha_e$ of 0.2. The permeation rate is 24 g-mil/m²-hr. These data clearly demonstrate the surprising effect caused by the presence of PEOX in the separation membrane. The SAN resin alone exhibits a modest selectivity for hexane over ethanol. By contrast, the modified membrane of this invention exhibits a very high selectivity for ethanol over hexane. Moreover, the permeation rates obtained with the membrane of this invention are significantly higher than those obtained with the SAN membrane alone. The $\alpha_e$ values for the membranes of this invention are extremely high. By contrast, the highest reported literature value for $\alpha_e$ in an ethanol/hexane seperation for any membrane is 8.0.

What is claimed is:

1. A process for separating mixtures of 2 or more organic compounds, or a mixture of water and an organic compound miscible therewith, comprising
   (a) contacting one side of a membrane comprising a blend of a first polymer of a 2-oxazoline and at least one other polymer which is not a polymer of a 2-oxazoline and which other polymer is miscible with said first polymer in the proportions thereof present in the blend, and in which blend the weight ratio of said first polymer to said other polymer is from about 19:1 to about 1:19 with a fluid feed mixture containing 2 organic compounds of water and an organic compound miscible therewith, and
   (b) withdrawing from the other side of said membrane a permeate in vapor form, said permeate containing a higher concentration of one component of the feed mixture than is present in the feed mixture.

2. The process of claim 1 wherein the feed mixture comprises hexane and ethanol.

3. The process of claim 1 wherein the feed mixture comprises water and ethanol.

* * * * *